(12) United States Patent
Wheatley et al.

(10) Patent No.: US 8,501,294 B1
(45) Date of Patent: *Aug. 6, 2013

(54) FRICTION PAD ON DASHBOARD FOR PORTABLE HANDHELD ELECTRONIC DEVICE

(75) Inventors: Alan J. Wheatley, Draper, UT (US); Bryce Craig, Alpine, UT (US)

(73) Assignee: American Covers, Inc., Bluffdale, UT (US)

( * ) Notice: Subject to any disclaimer, the term of this patent is extended or adjusted under 35 U.S.C. 154(b) by 290 days.

This patent is subject to a terminal disclaimer.

(21) Appl. No.: 12/979,690

(22) Filed: Dec. 28, 2010

Related U.S. Application Data

(60) Provisional application No. 61/371,853, filed on Aug. 9, 2010, provisional application No. 61/290,614, filed on Dec. 29, 2009.

(51) Int. Cl.
*B32B 3/30* (2006.01)
*B32B 7/12* (2006.01)
*B32B 27/40* (2006.01)
*B60R 7/06* (2006.01)
*B23P 17/04* (2006.01)

(52) U.S. Cl.
USPC ......... 428/40.1; 428/42.1; 428/160; 428/343; 428/423.1

(58) Field of Classification Search
USPC ............ 428/42.1, 156, 160, 343, 423.1, 40.1; 224/483; 29/428
See application file for complete search history.

(56) References Cited

U.S. PATENT DOCUMENTS

| | | | |
|---|---|---|---|
| 2,128,118 A | 7/1937 | Burford |
| 2,243,554 A | 5/1941 | Epstein |
| 2,466,502 A | 4/1949 | Stiller |
| 2,642,248 A | 6/1953 | Semon |
| 2,762,868 A | 9/1956 | Wandel |
| 3,445,135 A | 5/1969 | Masi |
| 3,567,871 A | 3/1971 | Walter |
| 3,654,047 A | 4/1972 | Berkowitz |
| 4,026,033 A | 5/1977 | Martin |
| 4,335,773 A | 6/1982 | Masi |
| 4,358,488 A | 11/1982 | Dunklin et al. |

(Continued)

FOREIGN PATENT DOCUMENTS

| WO | WO 02/35975 | 5/2002 |
|---|---|---|
| ZA | 20004637 | 9/2000 |

OTHER PUBLICATIONS

1999 Catalogue; Canadian Tire; 2 pages.

(Continued)

*Primary Examiner* — Thao T. Tran
(74) *Attorney, Agent, or Firm* — Thorpe North & Western LLP

(57) ABSTRACT

A frictional pad in combination with an upward facing support surface upon which the frictional pad is adhered and upon which a handheld electronic device is selectively disposed and held in a non-adhesive, non-slip, tacky fashion by the frictional pad. The frictional pad has a repositionable adhesive film releasably and repositionably adhered to the upward facing support surface. A squat dome is affixed to the upward facing support surface by the repositionable adhesive film. The squat dome has a continuous outward facing surface facing and contacting the handheld electronic device. A majority of the outward facing surface is continuous, smooth and parallel with the repositionable adhesive film.

28 Claims, 6 Drawing Sheets

U.S. PATENT DOCUMENTS

| | | | |
|---|---|---|---|
| D278,057 S | 3/1985 | McMaster |
| 4,528,232 A | 7/1985 | Cliffe |
| 4,749,222 A | 6/1988 | Idland |
| 4,759,058 A | 7/1988 | Sutton |
| 4,815,515 A | 3/1989 | Lee |
| 4,817,139 A | 3/1989 | Russo |
| 4,862,944 A | 9/1989 | Hendershot |
| D308,062 S | 5/1990 | Leoni et al. |
| 4,944,311 A | 7/1990 | Eldridge, Jr. et al. |
| 4,986,496 A | 1/1991 | Marentic et al. |
| 5,036,866 A | 8/1991 | Eldrige, Jr. et al. |
| D323,829 S | 2/1992 | Martinsen et al. |
| D350,356 S | 9/1994 | Wood |
| 5,358,094 A | 10/1994 | Molinaro |
| 5,508,084 A | 4/1996 | Reeves et al. |
| 5,593,769 A | 1/1997 | Wolf et al. |
| 5,599,617 A | 2/1997 | Ewald |
| 5,638,249 A | 6/1997 | Rubino |
| 2,794,767 A | 8/1998 | Wilson |
| 5,794,767 A | 8/1998 | Wilson |
| 5,829,507 A | 11/1998 | Pawlowski |
| 5,899,010 A | 5/1999 | Peck |
| 6,089,516 A | 7/2000 | Yates |
| 6,117,526 A | 9/2000 | Marks |
| 6,246,764 B1 | 6/2001 | Owen et al. |
| D449,043 S | 10/2001 | Chow et al. |
| D449,831 S | 10/2001 | Chow |
| D453,017 S | 1/2002 | Gledhill |
| 6,372,323 B1 | 4/2002 | Kobe et al. |
| 6,461,709 B1 | 10/2002 | Janssen |
| 6,506,271 B1 | 1/2003 | Yates |
| 6,535,606 B2 | 3/2003 | Cox |
| 6,598,653 B1 | 7/2003 | Gonzalez |
| 6,610,382 B1 | 8/2003 | Kobe et al. |
| 6,640,477 B1 | 11/2003 | Timpson et al. |
| 6,673,409 B1 | 1/2004 | Wheatley |
| 7,125,602 B2 | 10/2006 | Wheatley |
| 7,159,792 B2 | 1/2007 | Wheatley |
| 7,252,867 B2 | 8/2007 | Wheatley |
| 7,293,719 B2 * | 11/2007 | Wheatley et al. ............... 239/56 |
| 7,910,188 B2 | 3/2011 | Wheatley |
| 7,923,088 B2 | 4/2011 | Wheatley |
| 2004/0084492 A1 | 5/2004 | Wheatley |
| 2005/0169793 A1 * | 8/2005 | Wheatley et al. ............... 422/5 |
| 2005/0199668 A1 | 9/2005 | Wheatley |
| 2005/0271847 A1 | 12/2005 | Antonini |
| 2006/0121250 A1 | 6/2006 | Wheatley |
| 2006/0154029 A1 | 7/2006 | Antonini |
| 2006/0196964 A1 * | 9/2006 | Wheatley et al. ............... 239/57 |
| 2006/0198978 A1 | 9/2006 | Antonini |
| 2009/0004420 A1 | 1/2009 | Wheatley |
| 2009/0072045 A1 * | 3/2009 | Wheatley et al. ............... 239/56 |
| 2010/0001151 A1 | 1/2010 | Wheatley |
| 2010/0065654 A1 * | 3/2010 | Wheatley et al. ............... 239/56 |
| 2011/0155884 A1 | 6/2011 | Wheatley |
| 2011/0165383 A1 | 7/2011 | Wheatley |

OTHER PUBLICATIONS

3M, Product Bulletin PIJ180/180C, Release G, Effective Oct. 2008; 12 pages.

Cellgells Stick Almost Anywhere—Cell Phones, Music Devices, Laptops, Helmets, Cars . . . ; http://www.celgells.com; 1 page; as accessed on Jun. 5, 2009.

Crown Products; 2002; www.crownprod.com.

Dashmat Ultimate the Revolutionary Breakthrough Dashboard Cover; Saddleman Inc. 1998; 2 pages.

Egrips® Non-slip! Technology; http://www.egrips.com/technology; 2 pages; as accessed on Nov. 19, 2009.

Egrips® Non-slip! Technology; http://egrips.com/ ;3 pages; as accessed on Jun. 22, 2009.

Egrips® Non-slip! Technology; http://egrips.com/faq; 3 pages; as accessed on Jun. 22, 2009.

FNN—Fleet NewsNet: Company Car Fleet Management Solutions; p. 1-4; Roadtest; www.fleetnewsnet.co.uk.

General Electric "Friction Pad Kit" Instructions Field Made for MPD, MPD Friction Pad; Aug. 19, 1988.

Grip N Stay, It's Time to Get a Grip; http://www.gripnstay.com/catalog/index.php?main_page=index; 1 page; as accessed on Dec. 4, 2009.

http://bracketron.com/index.php?catied=16&pid=24; Bracketron, Inc.; Nav-Mat Portable GPS Dash Mount; as accessed Nov. 2009; 2 pages.

http://www.bracketron.com/?catid=11; bracketron Inc.; GPS Accessories; as accessed Nov. 2009; 2 pages.

http://www.bracketron.com/?includes/phpThumb/phpThumb.php?src-../../_products/UFM-100B...; Bracketron Inc.; NavMat; as accessed Nov. 2009; 1 page.

Non-Slip Grip-it-Strips® fro Laptops; 1 page; 2010.

U.S. Appl. No. 13/045,057, filed Mar. 10, 2011; Alan J. Wheatley; office action issued Jun. 3, 2011.

U.S. Appl. No. 12/987,662, filed Jan. 10, 2011; Alan J. Wheatley.

U.S. Appl. No. 13/045,094, filed Mar. 10, 2011; Alan J. Wheatley; office action issued Jul. 1, 2011.

U.S. Appl. No. 10/791,304, filed Mar. 1, 2004; Alan J. Wheatley.

U.S. Appl. No. 12/979,601, filed Dec. 28, 2010; Alan J. Wheatley.

U.S. Appl. No. 12/979,601, filed Dec. 28, 2010; Alan J. Wheatley, office action dated Mar. 1, 2013.

U.S. Appl. No. 12/979,763, filed Dec. 28, 2010; Aaron Irvin; notice of allowance dated Apr. 15, 2013.

* cited by examiner

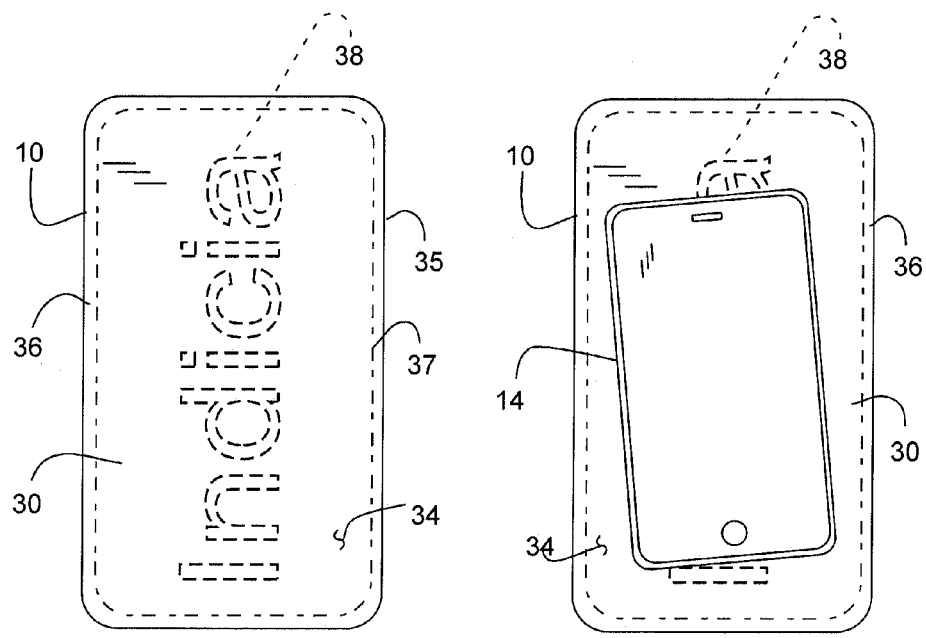
Fig. 1a  Fig. 1b
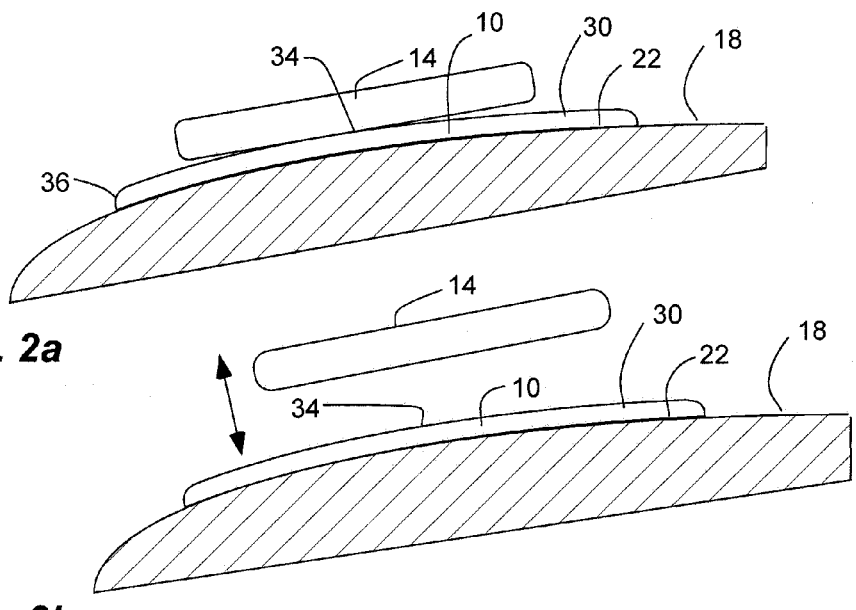
Fig. 2a
Fig. 2b

FRICTION PAD ON DASHBOARD FOR PORTABLE HANDHELD ELECTRONIC DEVICE

PRIORITY CLAIM

Priority is claimed to U.S. Provisional Patent Application Ser. No. 61/371,853, filed Aug. 9, 2010, which is hereby incorporated herein by reference in its entirety.

Priority is claimed to U.S. Provisional Patent Application Ser. No. 61/290,615, filed Dec. 29, 2009, which is hereby incorporated herein by reference in its entirety.

RELATED PATENT(S)/APPLICATION(S)

This is related to U.S. Pat. Nos. 6,673,409; 7,125,602; and 7,252,867; and US Patent Publication Nos. 2009-0004420; 2006-0121250 and 2010-0001151; which are hereby incorporated herein by reference in their entirety. This is also related to U.S. patent application Ser. No. 12/979,690, filed Dec. 28, 2010, which is hereby incorporated herein by reference in its entirety.

BACKGROUND

1. Field of the Invention

The present invention relates generally to a frictional pad to be repositionably adhered to an upwardly facing support surface, such as a vehicle dashboard or console, and to receive a portable handheld electronic device, such as a cell phone, GPS or digital music player, thereon to substantially retain the portable handheld device on the upwardly facing support surface.

2. Related Art

Frictional holding pads have been developed for placing on a horizontal surface to hold and retain a handheld item. Some pads are simply a sheet of rubber or rubber-like material. Others are simply a sheet of rubber-like material with a matrix of apertures therethrough. Other pads are tacky with a contoured surface and can cling to a dashboard and hand held device by mechanical or specific adhesion. For example, see U.S. Pat. Nos. 6,673,409; 7,125,602 and 7,252,867; and U.S. Patent Publication No. 2009-0004420. Other devices provide a tray or container for receiving items. For example, see the Max Grip™ Dash Tray.

Other pads have been developed for placing on the handheld item itself. For example, see Egrips® anti-skid silicon skins or appliqués; GripNStay® adhesive grips; Grip-It-Strips® slip resistant textured strips with self adhesive backing; US Patent Publication Nos. 2006-0198978; 2006-0154029; 2005-0271847; and U.S. Pat. No. 6,117,526. See also U.S. Pat. Nos. 4,986,496; 5,508,084; 6,372,323 and 6,610,382. Stickers or decals have been developed that can be applied to cell phones. For example, see CellGells™ adhesive decals. Another pad has been developed that is tacky and clings to the handheld item. For example, see Gadget Grips® frictional pads by HandStands® and US Patent Publication No. 2006-0121250.

Still other devices have been developed to secure items, such as a GPS, in a vehicle. The GPS navigation systems are often provided with a mount so hold the system, which has a viewing screen, in a suitable position for viewing while driving. Various mounting systems have been proposed, including a suction cup that holds by suction to the windshield or dash.

In some locals it is illegal to mount object to the windshield. In addition, such mounting can interfere with normal vision through the windshield. It is also possible to mount the suction cup on the vehicle dashboard or consol, but such surfaces are often contoured or provided with functional and decorative items that interfere with the operation of the suction cup. An adhesive plate is also sometimes provided that can be adhesively applied to the dash, and that can receive the suction cup. It may, however, be undesirable to us an adhesive on the dashboard as such adhesive can leave a residue or remove dash covering. Another option is a device that holds a plate in place by use of several weighted ballasts. Such devices can be bulky and unsightly. Still other devices can provide a plate or other mount secured to the dash by specific or mechanical adhesion. See for example Sticky Pad GPS Dash Mount from HandStands® and US Patent Publication No. 2010-0001151.

SUMMARY OF THE INVENTION

It has been recognized that it would be advantageous to develop a frictional holding pad to selectively secure an item, such as a handheld electronic device (e.g. a cell phone, GPS or digital music player) to a support surface (e.g. a dashboard or console of a vehicle) to secure the item in the vehicle, even during movement of the vehicle. In addition, it has been recognized that it would be advantageous to secure the item in such a way as to resist marring or damage or alteration to the support surface. Furthermore, it has been recognized that it would be advantageous to secure the item in such a way without modifying the item. In addition, it has been recognized that it would be advantageous to secure the item with the pad such that the pad remains on the support surface while the item is releasably held or secured to the pad.

The invention provides a frictional pad in combination with an upward facing support surface upon which the frictional pad is adhered and upon which a handheld electronic device is selectively disposed and held in a non-adhesive, non-slip, tacky fashion by the frictional pad. The frictional pad includes a repositionable adhesive film releasably and repositionably adhered to the upward facing support surface. A squat dome is affixed to the upward facing support surface by the repositionable adhesive film. The squat dome has a continuous outward facing surface facing and contacting the handheld electronic device. A majority of the outward facing surface is continuous, smooth and parallel with the repositionable adhesive film. The squat dome is a polyurethane dome. The polyurethane dome includes polyol and catalyst in a ratio of between 0.63 and 0.85.

In accordance with a more detailed aspect of the present invention, the pad or dome can further include a rib protruding from the continuous outward facing surface adjacent a perimeter thereof. A top of the rib and a portion of the continuous outward facing surface can form only two points of contact between the handheld electronic device and the frictional holding pad. A majority of the handheld electronic device can be elevated off of the continuous outward facing surface by the rib.

In addition, the invention provides a pad in combination with an upward facing support surface of a dashboard or consol of a vehicle upon which the frictional pad is adhered and upon which a cell phone, GPS or digital music player is selectively disposed and held in a non-adhesive, non-slip, tacky fashion by the frictional pad. The frictional pad includes a repositionable adhesive film releasably and repositionably adhered to the upward facing support surface of the dashboard or consol of the vehicle. A polyurethane squat dome is affixed to the upward facing support surface by the repositionable adhesive film. The dome has a continuous outward facing surface facing and contacting the cell phone, GPS or digital music player. A majority of the outward facing surface is continuous, smooth and parallel with the repositionable adhesive film. The polyurethane dome includes a polyurethane material with a polyol and a catalyst in a ratio of 0.63 to 0.85. The dome is translucent or transparent. A graphic layer is disposed between the adhesive film and the dome and visible through the dome.

Furthermore, the invention provides a method for selectively securing a handheld electronic device to an upward facing support surface of a dashboard or console of a vehicle, comprising: adhering a repositionable adhesive film of a frictional pad to the upward facing support surface of the dashboard or console of the vehicle, the pad comprising a squat dome affixed to the upward facing support surface by the repositionable adhesive film; selectively placing the handheld electronic device on a continuous upward facing surface, the continuous upward facing surface facing and contacting the handheld electronic device with a majority being continuous and parallel with the repositionable adhesive film; and removing the handheld electronic device from the upward facing surface of the frictional pad while the frictional holding pad remains on the upward facing support surface of the dashboard or consol of the vehicle In accordance with a more detailed aspect of the present invention, the method can include placing the handheld electronic device on a rib protruding from the continuous upward facing surface adjacent a perimeter thereof to form only two points of contact between the handheld electronic device and the frictional holding pad and rib with a majority of the handheld electronic device elevated off of the continuous upward facing surface by the rib.

BRIEF DESCRIPTION OF THE DRAWINGS

Additional features and advantages of the invention will be apparent from the detailed description which follows, taken in conjunction with the accompanying drawings, which together illustrate, by way of example, features of the invention; and, wherein:

FIG. 1a is a top view of a frictional holding pad in accordance with an embodiment of the present invention;

FIG. 1b is a top view of the frictional holding pad of FIG. 1a with an electronic device shown on an upward or outwardly facing surface of the pad FIG. 2a is a side view of the frictional holding pad of FIG. 1a with an electronic device thereon and disposed on an upward facing support surface, such as a dashboard or console of a vehicle;

FIG. 2b is a side view of the frictional pad on the upward facing support surface of FIG. 1a shown with the electronic device being removed from or placed on the upward or outward facing surface;

FIG. 4 is an exploded perspective view of the frictional holding pad of FIG. 1a;

FIG. 5 is a partial cross-sectional view of the frictional holding pad of FIG. 1a;

FIG. 10 is an exploded perspective view of the frictional holding pad of FIG. 9a;

FIG. 11 is a partial cross-sectional view of the frictional holding pad of FIG. 91a;

Figure 3:
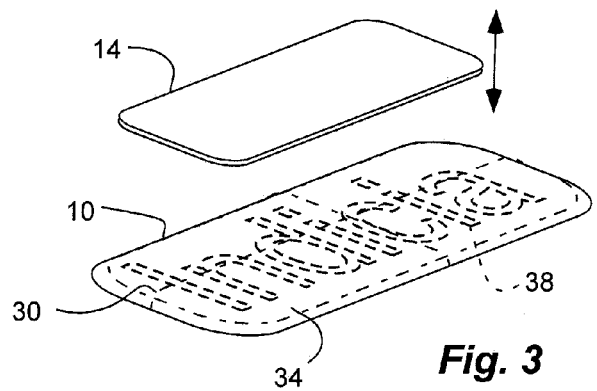
FIG. 3 is a perspective view of the frictional holding pad of FIG. 1a shown with the electronic device being removed or placed thereon.
Figure 4:
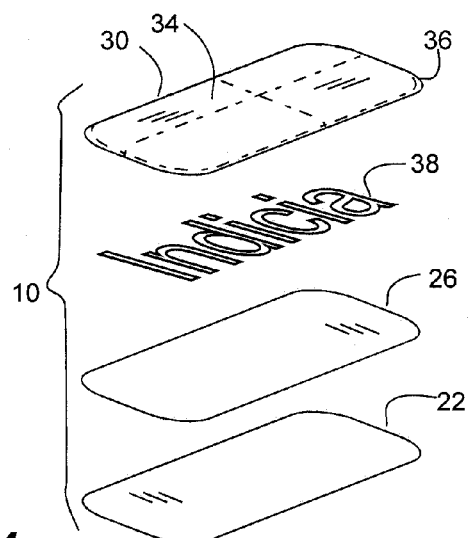
Figure 5:
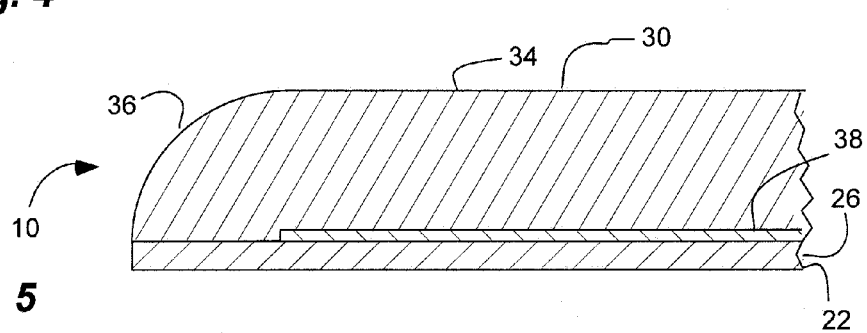

Reference will now be made to the exemplary embodiments illustrated, and specific language will be used herein to describe the same. It will nevertheless be understood that no limitation of the scope of the invention is thereby intended.

DETAILED DESCRIPTION OF EXAMPLE EMBODIMENT(S)

As illustrated in FIGS. 1a-5, a frictional holding pad, indicated generally at 10, in an example implementation in accordance with the invention is shown disposed/adhered on an upwardly facing support surface 18, such as a dashboard or console or armrest of a vehicle, and upon which a handheld portable electronic device 14, such as a cell phone, GPS (global positioning system) or digital music player (MP3 player, iPod® or the like) is selectively disposed and held in a non-adhesive, non-slip, tacky fashion to retain the device thereon. The handheld portable electronic device 14 can be a cell phone; an MP3 player (iPod® or the like) or other digital music player; a gaming device (Nintendo® DS; PSP®; etc.); a camera; a global positioning system (GPS) system; a remote control; a personal digital assistant (PDA); a radio; a two-way radio; a citizens band radio; a walkie-talkie; a video recorder; a cassette player and/or recorder; a mini-cassette recorder; a DVD player; a portable television; a digital camera; a video camera; a portable computer (laptop computer, iPad®, or the like); a radar detector; an e-book or e-reader (Kindle®, Nook®, iPad®, Sony Reader™, or the like), etc. Other items may also be retained on the frictional pad, such as writing implements, glasses, sun glasses, change, note pad, etc. The upwardly facing surface 18 can be a dashboard or console or armrest of a vehicle.

The upwardly facing surface faces generally upwardly, and can be inclined or horizontal, and can be flat or curved in one or more directions. The upwardly facing surface can be mobile or displaceable, and subject to acceleration (and deceleration and/or centripetal), and/or impact or bumps, such as a vehicle surface. Movement, momentum and/or acceleration or changes therein can be transferred from the upwardly facing surface to the handheld portable electronic device through the frictional pad. The pad 10 can be adhered to the upward facing support surface 18 and can receive the electronic device thereon. The support surface 18 can be arcuate in one (as shown in FIGS. 1 and 2) or more directions, or it can be flat and straight.

The frictional pad 10 can include an adhesive film 22 adhered to the upward facing support surface 18. The adhesive can be selected to provide sufficient adhesion between the pad and the support surface without un-deliberately separating, or with only deliberately separating by the user. The adhesive can also be selected so that the pad can be removed if desired. Thus, the adhesive film can include a releasable and repositionable adhesive, as opposed to a permanent adhesive. The adhesive film can use a chemical adhesive, and can be a repositionable adhesive film 22 (such as Controltac™ adhesive film by 3M™) that releasably and repositionably adheres to the upward facing support surface. Furthermore, the adhesive and/or the adhesive film can be substantially transparent, or at least translucent, so that the surface of the device can be visible through the pad. The adhesive and/or adhesive layer can be a removable 3M Controltac™ adhesive.

The adhesive film 22 can be disposed on a substrate 26. The substrate 26 can also be a film. In one aspect, the substrate can be substantially non-absorbent. The substrate can provide a surface, such as an upper surface opposite the adhesive that can be printable. In addition, the substrate can be substantially transparent, or at least translucent, so that the support surface can be visible through the pad. The substrate can be a printed 3M Graphics Vinyl. Alternatively, the substrate can be a polyester film. The substrate can be any laminated (non-porous) substrate, including: PP, PVC, PET, ABS, polyester, regular sticker paper, vinyl, or tin metal (foil). Alternatively, the substrate can be other films with other characteristics, such as reflective, metal shine, textured, etc.

A dome 30 is adhered to the upward facing support surface 18 by the adhesive film 22. The dome 30 is secured to the adhesive film 22 and/or substrate 26. The dome can have a broad, flat, squat shape with an upward facing or outward facing or outfacing surface 34 that faces and contacts the handheld electronic device 14. A majority, or essentially all, of the upward facing surface can be continuous and smooth and parallel with the repositionable adhesive film, and thus the upward facing surface. In addition, the upward facing surface can be flat or substantially flat. Furthermore, the upward facing surface can be surrounded by a radius perimeter. Thus, the perimeter of the upward facing surface curves toward the adhesive layer and support surface. In one aspect, all of the outfacing surface 34 can be flat and smooth and continuous between the radiused perimeter. The dome, pad and/or upward facing surface can be tacky to cling to the electronic device, such as by mechanical or specific adhesion. Furthermore, the pad can be substantially transparent, or at least translucent, so that the upward facing support surface can be visible through the pad. The dome can be formed of polyurethane. In one aspect, the pad and/or dome can have a perimeter rib, elevated strip, or anti-friction bar extending therefrom, as described below.

The dome 30 or the upward facing surface 34 thereof (and the rib) provide a non-slip surface or contact points that can engage the electronic device 14 and retain it on the upward facing surface of the pad (and the rib). Thus, the upward facing surface 34 (and rib) can be sufficiently tacky to cling to the electronic device 14. The tackiness of the upward surface (and rib) can be obtained through various factors, which can include material, hardness/softness, and coefficient of friction. As described above, the dome (and rib) can be formed of polyurethane. The polyurethane can be formed by combining a polyol with a catalyst or hardener. In one aspect, the ratio of polyol to catalyst can be between 0.63 to 0.85 in one aspect, and between 0.63 to 0.75 in another aspect, so that there is more polyol than catalyst. Typical polyurethane is obtained by mixing polyol and catalyst in a 1:1 ratio. In addition, in one aspect, the upward facing surface 34 or dome 30 (and rib) can have a hardness between 10 and 35 Shore D. In another aspect, the outfacing surface 34 or dome 30 (and rib) can have a hardness between 12 and 21 Shore D. In another aspect, the outfacing surface 34 or dome 30 (and rib) can have a hardness between 12 and 18 Shore D. Other non-tacky stickers or decals typically can have a hardness of 60 Shore D or harder. Furthermore, the outfacing surface 34 (and rib) can have a coefficient of friction of between 0.3 and 0.1 in accordance with ASTM D 1894.

A strength of the adhesive bond between the adhesive film and the upward facing support surface can be greater than a tacky cling between the upward facing surface of the pad and the electronic device. Thus, the pad remains on the support surface while the device is removed from the pad and support surface. In addition, the contact surface between the adhesive layer of the pad and the support surface can be greater than the upward facing surface of the pad contacting the electronic device to further retain the pad on the support surface as the device is removed from the pad and support surface. Furthermore, the contact surface between the adhesive layer of the pad can have a perimeter 35 greater than and circumscribing a perimeter 37 of the upward facing surface of the pad that contacts the electronic device.

A graphic layer 38 can be disposed between the adhesive film 22 and the dome 30, or between the substrate 26 and the dome 30. The graphic layer can include ink disposed on or printed on the substrate. For example, the graphic layer can be an aqueous based inkjet ink. The graphic layer can include indicia, such as a logo, a picture, etc. In addition, the graphic layer can include directions for use, orientation, care, etc. Furthermore, the graphic layer can be or can include other inclusions, as described in greater detail below. The graphic layer 38 can be visible through the dome 30. The graphic layer and/or inclusion can be smaller or can have a smaller size than the substrate and dome such that the graphic layer and inclusion are surrounded by a perimeter of the dome and substrate.

Figure 9A:
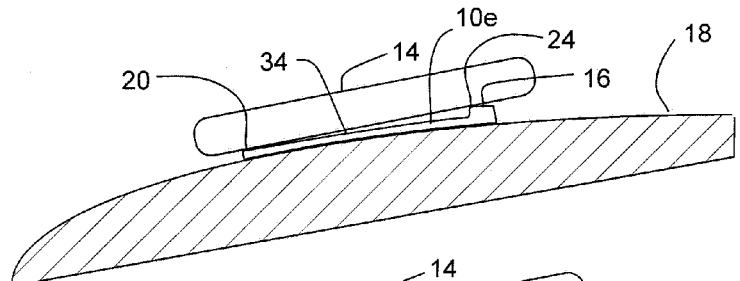
FIG. 9a is a side view of a frictional holding pad with an electronic device thereon and disposed on an upward facing support surface, such as a dashboard on console of a vehicle, in accordance with another embodiment of the present invention.
Figure 9B:
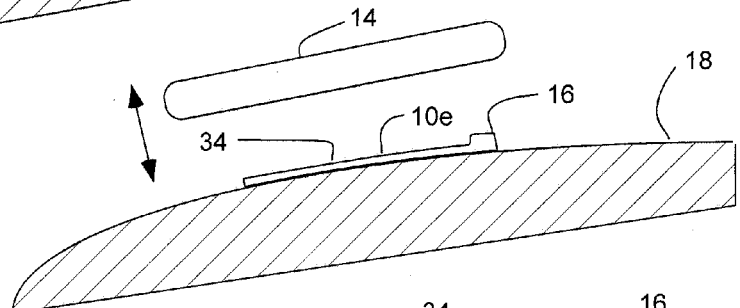
FIG. 9b is a side view of the frictional pad on the upward facing support surface of FIG. 9a shown with the electronic device being removed from or placed on the upward or outward facing surface.
Figure 10:
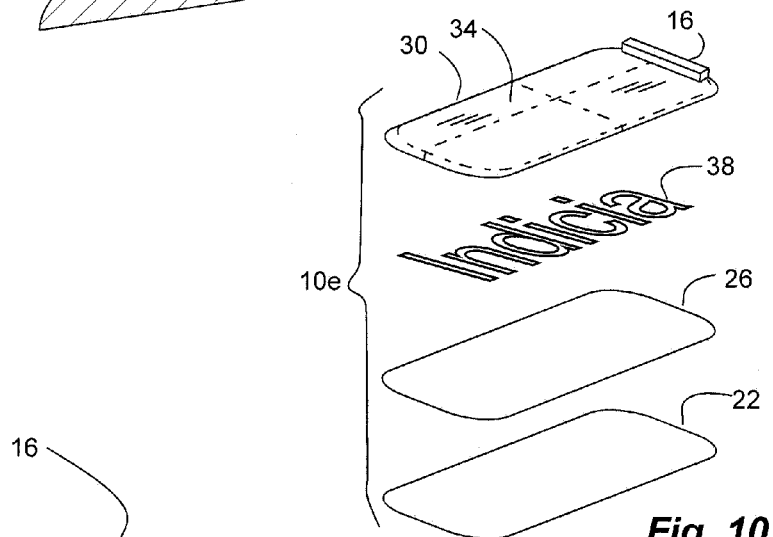
Figure 11:
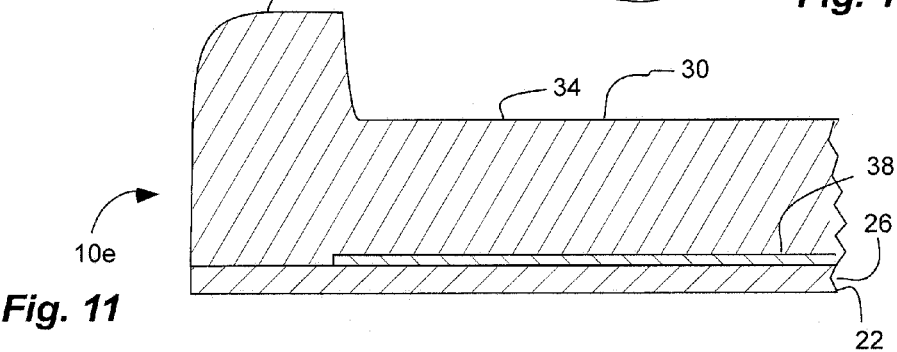

The pad 10 can have a rectangular shape with rounded corners, as shown. Alternatively, other shapes are possible, such as circular or scripted (i.e. shaped-like letters). In one aspect, the pad can be larger than the electronic device in one or both directions, as shown in FIGS. 1a-5. In another aspect, the pad can be smaller than the electronic device in one or both directions, as shown in FIGS. 9a and 9b. In addition, the pad 10 can have a thickness between 1-4 mm in one aspect. The thickness of the pad is dimensionally stable so that the pad is not generally compressible. The pad can have a stiffness with a self-supporting flat layer, yet can be flexible enough to be bent to conform to a curvature of the upward facing support surface. The adhesive layer can be sufficient to overcome the stiffness of the pad and maintain the curved or bent nature of the pad when adhered to the surface. In addition, the pad can be elastic to return to its self-supporting flat layer. The pad and the upward facing surface can be substantially solid, flat, continuous and/or smooth.

Figure 6:
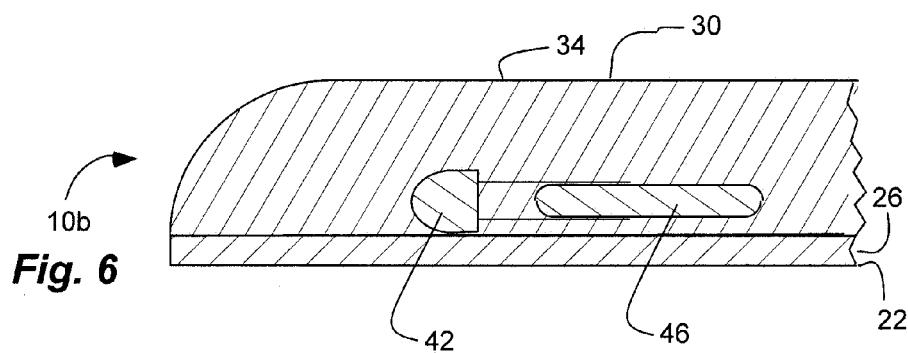
FIG. 6 is a partial cross-sectional view of another frictional holding pad in accordance with another embodiment of the present invention.
Figure 7:
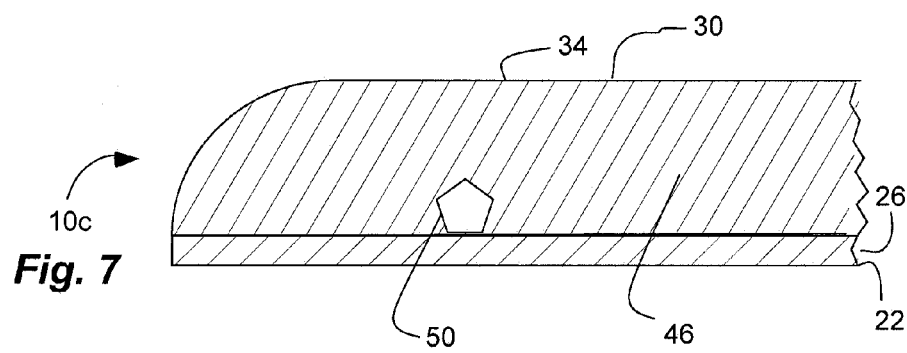
FIG. 7 is a partial cross-sectional view of another frictional holding pad in accordance with another embodiment of the present invention.

As indicated above, the graphic layer 38 can be or can include an inclusion. The inclusions can be embedded in the dome. For example, the graphic layer can be an etched metallic layer 42. The metallic layer can be etched to form the indicia. Other inclusions can be an LED (or other light source) and a battery power source; a hologram or lenticular artwork; an RFID computer chip or tag; a mirror; one or more gems; etc. For example, referring to FIG. 6, another frictional pad 10b as described above is shown with an LED 42 electrically coupled to a battery 46. The LED may remain continuously activated or lit. Alternatively, the LED may be activated, or the leads for the LED selectively contacted by the battery, such as by pressure applied to the pad. Alternatively, a light sensor can be electrically coupled between the battery and the LED to activate the LED in low light conditions. Other electronics can be included for special effects, such as flashing, etc. It will be appreciated that multiple lights or LEDs or one or more color can be included or embedded in the dome. As another example, referring to FIG. 7, another frictional pad 10c as described above is shown with a gem or faux gem 50 embedded in the dome. The inclusion(s) can be disposed on the adhesive film and/or substrate, and surrounded by the material of the dome so that the inclusion projects into the dome. Thus, the inclusions can be inclusions for the dome and/or the graphics layer.

The dome can also include inclusions embedded therein. For example, the dome can include a scented material, such as a scented oil, that is permeable through the polyurethane material of the dome. In addition, the dome can be colored and translucent. Furthermore, the dome can include a florescent material, or a glowing material.

Figure 8:
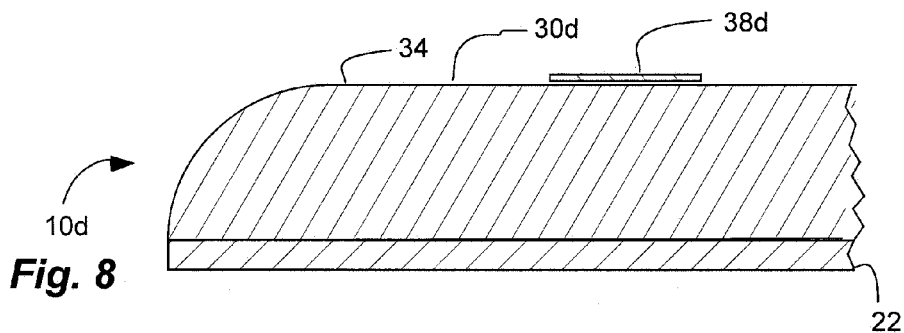
FIG. 8 is a partial cross-sectional view of another frictional holding pad in accordance with another embodiment of the present invention.

Referring to FIG. 8, another frictional pad 10d which is similar in many respects to those described above, can have an opaque dome 30d with a graphic layer 38d, such as printing, on the outfacing surface 34. The opaque dome 30d can have a color to match or complement the support surface.

As mentioned above, the pad can have any shape. In addition, the pad can be "scripted," i.e. shaped as particular letters, symbols, etc.; which can be interconnected or can be one or more separate and discrete portions.

As indicated above and referring to FIGS. 9a-11, the pad 10e can have a rib 16, raised or elevated strip, or antifriction bar, that can protrude from the upward facing surface adjacent a perimeter thereof. A top of the rib and a portion of the upward facing surface form only two separate and discrete points of contact 20 and 24 between the handheld electronic device 14 and the frictional holding pad 10e, as shown in FIG. 9a, with a majority of the handheld electronic device 14 elevated off of the upward facing surface 34 by the rib 16.

The rib 16 or anti-friction bar can protrude from the pad or upward facing surface 34 adjacent a perimeter of the pad or surface. A majority of the perimeter of the pad or surface can be continuous or flush with the flat upward facing surface. In one aspect, the rib or bar can be formed along a single edge of the pad or surface, such as along only one of four edges. In another aspect, the rib or bar can be formed along only one of 3 to 10 sides or edges. The sides or edges can be discrete or separate from one another, and can be linear or curved. In another aspect, the pad can be circular or curved, and the rib or bar can be curved to match the curvature of the pad. In another aspect, the rib or bar can be formed along less than 50% of the perimeter edge. In another aspect, the rib or bar can be formed along less than 25% of the perimeter edge. In another aspect, the rib or bar can be formed along less than 17% of the perimeter edge. Limiting the length of the bar or rib while maintaining a majority of the perimeter edge flush with the surface 34 allows the two points of contact to be formed between the device 14 and the pad, even if the device has a dimension longer than the pad. Thus, the perimeter is not enclosed or substantially enclosed by the rib or bar to resist interference with placing the device on the pad that might occur with a perimeter wall extending around all or a majority of the perimeter.

In one aspect, the rib 16 can extend approximately 0.5-2.5 mm above the upward facing surface. In another aspect, the rib can extend approximately 0.8-1.2 mm above the upward facing surface. In another aspect, the rib can extend approximately 1 mm above the upward facing surface. In one aspect, the pad outside the rib can have a thickness between approximately 1-4 mm. In another aspect, the pad outside the rib can have a thickness between approximately 2.4-2.8 mm. In one aspect, the pad and rib together can have a thickness of approximately 2.9-6.5 mm. In another aspect, the pad and rib together can have a thickness of approximately 3.4-3.8 mm. The thickness of the pad, along with the material makeup thereof, are selected to be flexible but self supporting. The thickness or height of the rib is selected to create two separate and discrete contact points.

Figure 13:
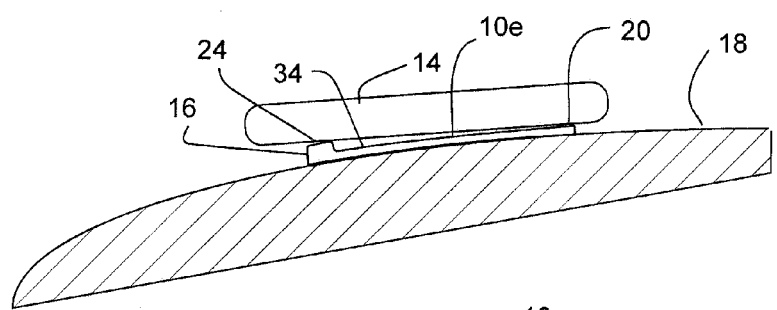
FIG. 13 is a side view of the frictional pad and electronic device of FIG. 9a shown with the pad and device in a different orientation.
Figure 14:
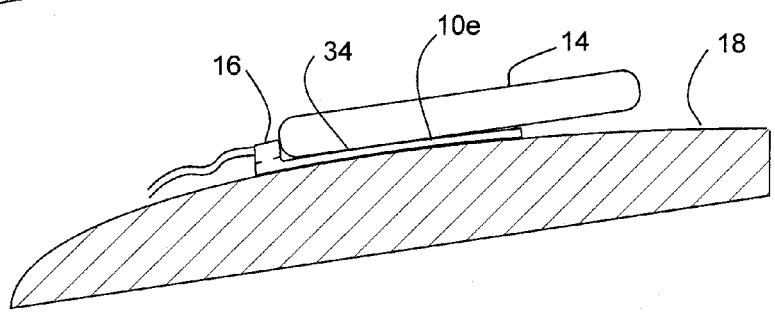
FIG. 14 is a side view of the frictional pad and electronic device of FIG. 9a shown with the pad in a different orientation and the device in a different position and orientation.

In one aspect, the rib or bar can be oriented horizontally and can be positioned at the top of the pad. In another aspect the rib or bar can be positioned at the bottom of the pad. The rib or bar 16 extending above the upward surface 34 can also angle or incline the handheld device 14 with respect to the support surface 18 to position the handheld device in a better viewing angle. For example, with the pad positioned on a dashboard angled and/or curved downward and backward, and with the rib or bar positioned at the bottom of the pad, a device or item, such as a radar detector or camera, can be disposed on the pad and rib and oriented level, or more level, or horizontal, or more horizontal, so the radar detector or camera can be properly focused and/or oriented (See FIG. 13). As another example, with the pad positioned on a dashboard angled and/or curved downward and backward, and with the rib or bar positioned at the top of the pad, a device or item, such as a cell phone or digital music player (MP3 or iPod®) can be disposed on the pad and rib and oriented at an angle or incline to face towards the user or driver for improved visibility of a display associated therewith (See FIG. 9a). As another example, with the pad positioned on a dashboard angled and/or curved downward and backward, and with the rib or bar positioned at the bottom of the pad, a device or item, such as cell phone or digital music player (MP3 or iPod®) can be disposed on the pad and abutting to a side of the rib (so that the rib acts as a shelf), and oriented at an angle or incline to face towards the user or driver for improved visibility of a display associated therewith (See FIG. 14). The rib or bar acting as a shelf can be useful for sever or steeply inclined dashboards. Furthermore, a slot can be formed in the rib or bar, transverse to a longitudinal axis or long length thereof, to receive a power and/or data cord associated with the cell phone or digital music player. As stated above, limiting the rib or bar to a single side of the pad allows the pad to accommodate devices or items that may be longer or larger than the pad in at least one direction.

Figure 12A:
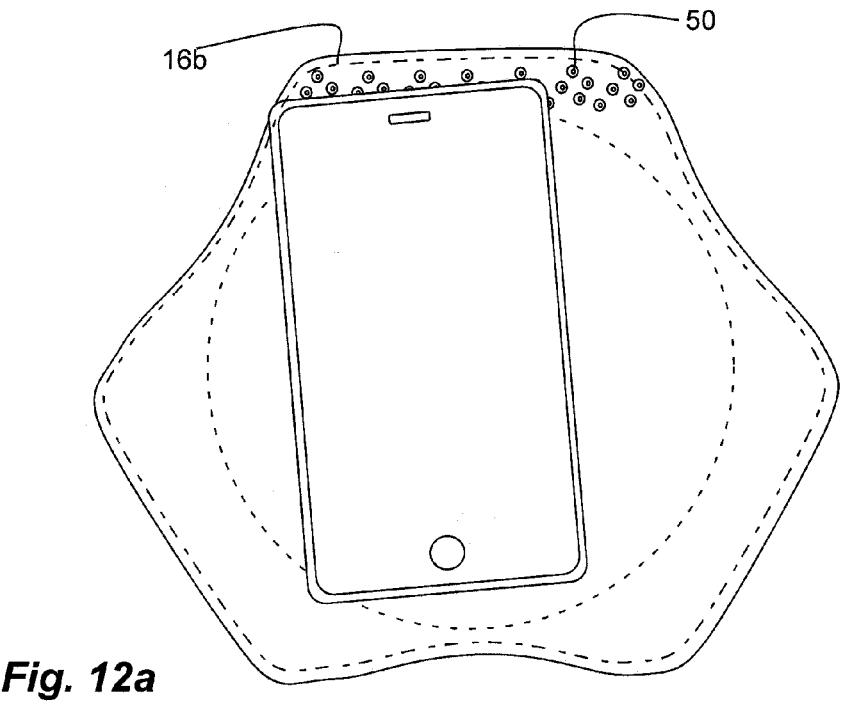
FIG. 12a is a top view of another frictional holding pad in accordance with another embodiment of the present invention shown with an electronic device disposed thereon.
Figure 12B:
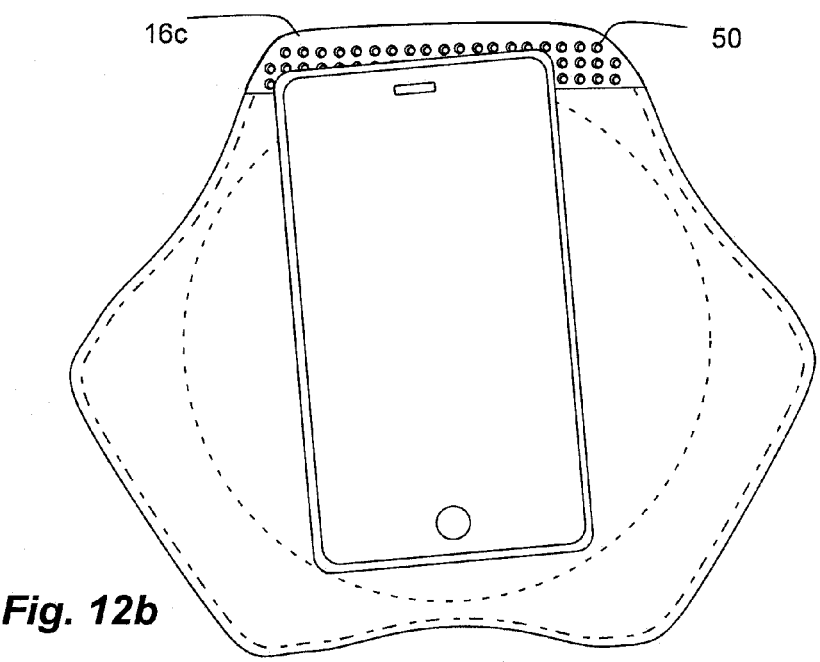
FIG. 12b is a top view of another frictional holding pad in accordance with another embodiment of the present invention shown with an electronic device disposed thereon.

In one aspect, the rib 16 can be linear with a flat and continuous upper surface, as shown in FIGS. 9a-11. In another aspect, the rib 16b can be an effective rib formed by a plurality of stiff raised fingers 50, as shown in FIG. 12a. In another aspect, the rib 16c can have a plurality of separate and distinct indentations 54 formed in an otherwise flat and continuous top surface, as shown in FIG. 12b. The fingers and/or indentations can be circular, or have a circular cross-section, and can be arrayed in a matrix. The fingers or holes can reduce the surface area of the contact point to facilitate removal of the device from the bar. In another aspect, the rib can have a single, long indentation or half-pipe oriented parallel with the rib and formed in the upper surface thereof; and that can receive a pencil, pen or the like. In another aspect, a slot can be formed in the rib or bar, transverse to a length thereof; and can receive a cord, such as a power cord, data cord or the like.

The rib can also be formed of polyurethane along with the dome, and can be transparent or at least translucent.

As discussed above, the dome or outfacing surface can have a radius perimeter. The pad can be made by pouring the polyurethane material on top of the substrate and graphic layer to form the dome and rib. Thus, the radius perimeter is obtained by individual pouring each pad or dome, without stamping or cutting the pads from a continuous layer. The graphic layer can be printed on the substrate having the adhesive film opposite the graphic layer. The graphic layer can be a discrete graphic contained within the pad or dome, as opposed to a continuous graphic.

In use, the adhesive film of the pad can be adhered to the support surface in a desired location. The electronic device can be placed on the upward facing surface (and rib) of the pad with the upward facing surface (and rib) contacting the device. The electronic device can be removed from the pad while the pad remains on the support surface. The frictional holding pad can be selectively placed on the upward facing support surface of a dashboard or consol of a vehicle. The handheld electronic device can be selectively placed on the upward facing surface (and rib) of the frictional holding pad. The handheld electronic device can be removed from the upward facing surface of the frictional holding pad while the frictional holding pad remains on the upward facing support surface of the dashboard or consol of the vehicle.

In other aspects, the rib or anti-friction bar can be or can include: curved, such as to hold a pen or other writing implement; curved or slotted, such as to hold electrical or data cords, such as phone charger cords; slotted to hold a parking card, credit card, access card, security card, or the like or other thin (paper thin to credit card thin) item with indicia or information thereof for ready access; high ridges to limit to 2 contact points on the surface of the substrate; a graphic arrow molded into bar to show placement direction on dash; a location for an embedded company logo; glow in dark bar or other so that the user can see location of sticky pad on dashboard at night; put radar detector at optimal angle for signal; a raised rubber or other non-stick area to protect cell phone battery cover from getting stuck (or limiting cling); change material to a "Super High Stick" (gum-like) and use it as location for items to be more permanently secured; scent the plastic bar or pad for slight aroma ("scent spot"); insert a thermometer into plastic bar or pad to indicate temperature; embedded a "fast pass" electronic signal toll pass or other electrical indicator for access or recording purposes; a coin or token holder; a button to hold a micro fiber bag; a place for a statuette to mount to; a fastener for an air freshener; etc.

Furthermore, the pad can be use to: hold guitar picks on a guitar or strap; hold books on a shelf (to stop them from slipping); placed on a treadmill, exercise bike, or the like to hold electronics or reading material (book or magazine or e-reader); larger versions for iPad/e-readers; incorporate into a case as a non-slip accessory (such as a dot to a leather case or other type case); hold scrapbook supplies on table (pins, beads, needles, etc.); hold sewing tools and implements on a table or sewing machine; place on computer, fridge, or other location to stick paper notes; hold baby trays/plates to the high-chair or table; hold items to airplane tray-tables; hold computers in place inside of a case (to resist sliding around); add a piece of this to a nylon strap for extra security when tying something down (4wheeler, tools, etc); place layer in tool box to stop tools from sliding around; place dot of material directly on tool or work glove to hold small items like nails, screws; raise computer or portion thereof; sticky note holder; luggage tags; holds a door closed (tacky hold); locker ID; or hold tools on a workbench or tool chest.

In another aspect, the adhesive between the support surface or dashboard and the dome or pad can be a permanent adhesive or more permanent adhesive.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The invention claimed is:

1. A frictional pad in combination with an upward facing support surface upon which the frictional pad is adhered and upon which a handheld electronic device is selectively disposed and held in a non-adhesive, non-slip, tacky fashion by the frictional pad, the frictional pad comprising:
   a) a repositionable adhesive film releasably and repositionably adhered to the upward facing support surface;
   b) a squat dome affixed to the upward facing support surface by the repositionable adhesive film;
   c) the squat dome having a continuous outward facing surface facing and contacting the handheld electronic device with a majority being continuous, smooth and parallel with the repositionable adhesive film;
   d) the squat dome being a polyurethane dome; and
   e) the polyurethane dome being formed by a polyol and a catalyst in a ratio of between 0.63 and 0.85.

2. The combination in accordance with claim 1, wherein the dome has a hardness between 10 and 35 Shore D.

3. The combination in accordance with claim 1, wherein the frictional pad further comprising:
   a rib protruding from the continuous outward facing surface adjacent a perimeter thereof, a top of the rib and a portion of the continuous outward facing surface forming only two points of contact between the handheld electronic device and the frictional holding pad with a majority of the handheld electronic device elevated off of the continuous outward facing surface by the rib.

4. The combination in accordance with claim 1, wherein the outward facing surface of the dome has a coefficient of friction of between 0.3 and 0.1 in accordance with ASTM D 1894.

5. The combination in accordance with claim 1, wherein the dome is translucent or transparent; and further comprising a graphic layer disposed between the adhesive film and the dome and visible through the dome.

6. The combination in accordance with claim 5, further comprising:
   a film with the adhesive film on one side; and
   the graphic layer printed on the other side.

7. The combination in accordance with claim 5, further comprising:
   a substrate with the adhesive film on one side and the graphic layer printed on the other side; and
   the substrate is translucent or transparent so that the entire pad except for the graphic layer is translucent or transparent and the support surface is visible therethrough.

8. The combination in accordance with claim 1, wherein the pad has a thickness between the outward facing surface and the adhesive film of between 1-4 mm.

9. The combination in accordance with claim 1, wherein the dome includes a scented material permeable through a polyurethane material of the dome.

10. The combination in accordance with claim 1, wherein the pad forms a flexible, self-supporting layer.

11. The combination in accordance with claim 1, wherein all of the outward facing surface is smooth and flat between a radius perimeter.

12. The combination in accordance with claim 1, wherein a strength of an adhesive bond between the adhesive film of the pad and the upward facing support surface is greater than a tacky bond between the outward facing surface of the pad and the handheld electronic device.

13. The combination in accordance with claim 1, wherein a contact surface between the adhesive layer of the pad and the upward facing support surface is greater than the outward facing surface of the pad contacting the handheld electronic device.

14. The combination in accordance with claim 1, wherein a contact surface between the adhesive layer of the pad has a perimeter greater than and circumscribing a perimeter of the outward facing surface of the pad contacting the handheld electronic device.

15. The combination in accordance with claim 1, wherein the graphic layer further comprises an etched metallic layer.

16. The combination in accordance with claim 1, further comprising:
    an LED and a battery power source embedded within the polyurethane dome.

17. The combination in accordance with claim 1, wherein the graphic layer includes a hologram.

18. The combination in accordance with claim 1, wherein the graphic layer includes a mirror surface.

19. A method for using the combination in accordance with claim 1, comprising:
    selectively placing the frictional holding pad on the upward facing support surface of a dashboard or consol of a vehicle;
    selectively placing the handheld electronic device on the outward facing surface of the frictional holding pad; and
    removing the handheld electronic device from the outward facing surface of the frictional holding pad while the frictional holding pad remains on the upward facing support surface of the dashboard or consol of the vehicle.

20. A frictional pad in combination with an upward facing support surface of a dashboard or consol of a vehicle upon which the frictional pad is adhered and upon which a cell phone, GPS or digital music player is selectively disposed and held in a non-adhesive, non-slip, tacky fashion by the frictional pad, the frictional pad comprising:
    a) a repositionable adhesive film releasably and repositionably adhered to the upward facing support surface of the dashboard or consol of the vehicle;
    b) a polyurethane squat dome affixed to the upward facing support surface by the repositionable adhesive film;
    c) the dome having a continuous outward facing surface facing and contacting the cell phone, GPS or digital music player with a majority being continuous, smooth and parallel with the repositionable adhesive film;
    d) the polyurethane dome includes a polyurethane material being formed by a polyol and a catalyst in a ratio of 0.63 to 0.85;
    e) the dome being translucent or transparent; and
    f) a graphic layer disposed between the adhesive film and the dome and visible through the dome.

21. The combination in accordance with claim 20, wherein
    a) the outward facing surface of the dome has a coefficient of friction of between 0.3 and 0.1 in accordance with ASTM D 1894;
    b) the dome has a hardness between 12 and 21 Shore D; and
    c) the pad has a thickness between the outward facing surface and the adhesive film of between 1-4 mm.

22. The combination in accordance with claim 20, further comprising:
    a perimeter rib protruding from the continuous outward facing surface adjacent a perimeter thereof, a majority of the perimeter being continuous with the continuous outward facing surface, a top of the rib and a portion of the continuous outward facing surface forming only two points of contact between the cell phone, GPS or digital music player and the frictional holding pad with a majority of the cell phone, GPS or digital music player elevated off of the continuous outward facing surface by the perimeter rib.

23. The combination in accordance with claim 20, further comprising:
    a film with the adhesive film on one side and the graphic layer printed on the other side.

24. A frictional pad in combination with an upward facing support surface upon which the frictional pad is adhered and upon which a handheld electronic device is selectively disposed and held in a non-adhesive, non-slip, tacky fashion by the frictional pad, the frictional pad comprising:
    a) a repositionable adhesive film releasably and repositionably adhered to the upward facing support surface;
    b) a squat dome affixed to the upward facing support surface by the repositionable adhesive film;
    c) the squat dome having a continuous outward facing surface facing and contacting the handheld electronic device with a majority being continuous, smooth and parallel with the repositionable adhesive film;
    d) the squat dome being a polyurethane dome;
    e) the outward facing surface of the dome having a coefficient of friction of between 0.3 and 0.1 in accordance with ASTM D 1894; and
    f) the dome having a hardness between 12 and 21 Shore D.

25. The combination in accordance with claim 24, wherein the frictional pad further comprising:
    a rib protruding from the continuous outward facing surface adjacent a perimeter thereof, a top of the rib and a portion of the continuous outward facing surface forming only two points of contact between the handheld electronic device and the frictional holding pad with a majority of the handheld electronic device elevated off of the continuous outward facing surface by the rib.

26. The combination in accordance with claim 24, wherein the dome is translucent or transparent; and further comprising a graphic layer disposed between the adhesive film and the dome and visible through the dome.

27. The combination in accordance with claim 26, further comprising:
    a film with the adhesive film on one side; and
    the graphic layer printed on the other side.

28. The combination in accordance with claim 26, further comprising:
    the polyurethane dome being formed by a polyol and a catalyst in a ratio of between 0.63 and 0.85.

* * * * *